United States Patent [19]
Helwig et al.

[11] 3,941,034
[45] Mar. 2, 1976

[54] FILTER ATTACHMENT FOR AUTOMOBILE PASSENGER COMPARTMENT AIR INTAKE

[76] Inventors: Carl Helwig; Dolores F. Helwig, both of 1358 E. Colorado St., Glendale, Calif. 91205

[22] Filed: July 11, 1974

[21] Appl. No.: 487,580

[52] U.S. Cl. ............ 98/2.11; 55/484; 55/485; 55/316; 55/511; 55/514; 55/529; 55/385 A; 55/385 B
[51] Int. Cl.² ............................................. B60H 3/06
[58] Field of Search ............ 55/316, 372, 482, 486, 55/487, 488, 489, 490, 500, 511, 512, 514, 515, 524, 529, DIG. 12, 385, 387, 483, 485, 484; 98/2.11, 2.16, 2.17; 210/484

[56] References Cited
UNITED STATES PATENTS

| | | | |
|---|---|---|---|
| 2,139,014 | 12/1938 | Grieg | 55/490 X |
| 2,152,414 | 3/1939 | Knight | 98/2.16 |
| 2,764,251 | 9/1956 | Jessop | 55/316 |
| 2,807,201 | 9/1957 | Leslie et al. | 98/2.17 |
| 2,809,715 | 10/1957 | Zemkey | 55/486 X |
| 2,855,838 | 10/1958 | Krubel | 98/2.17 X |
| 3,260,370 | 7/1966 | Schwartzwalder | 55/486 X |
| 3,388,536 | 6/1968 | Nash | 55/514 X |
| 3,458,730 | 7/1969 | Juhlin | 55/511 |
| 3,568,416 | 3/1971 | Staunton | 55/316 |
| 3,679,058 | 7/1972 | Smith | 210/242 |
| 3,698,875 | 10/1972 | Yamada | 55/316 X |
| 3,702,049 | 11/1972 | Morris, Jr. | 55/387 X |
| 3,854,912 | 12/1974 | Terrel et al. | 55/316 X |

*Primary Examiner*—Frank W. Lutter
*Assistant Examiner*—David L. Lacey
*Attorney, Agent, or Firm*—Robert C. Comstock

[57] ABSTRACT

A filtering attachment for the air intake of an automobile passenger compartment. A large rectangular sheet of laminated foil, vinyl and paper has a central opening over which is mounted a filter unit. The filter unit comprises two layers of non-woven paper heat sealed together to form a plurality of adjacent pockets, each of which contains pieces of activated charcoal. A fine mesh screen is mounted in overlying relationship to the filter unit. The attachment is mounted in overlying relationship to the air intake of the automobile so that all air entering the passenger compartment passes through the filter unit.

6 Claims, 6 Drawing Figures

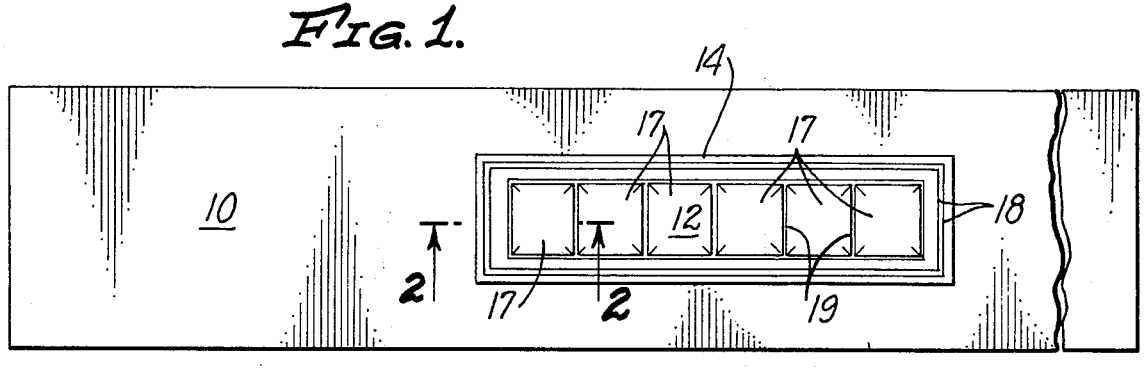
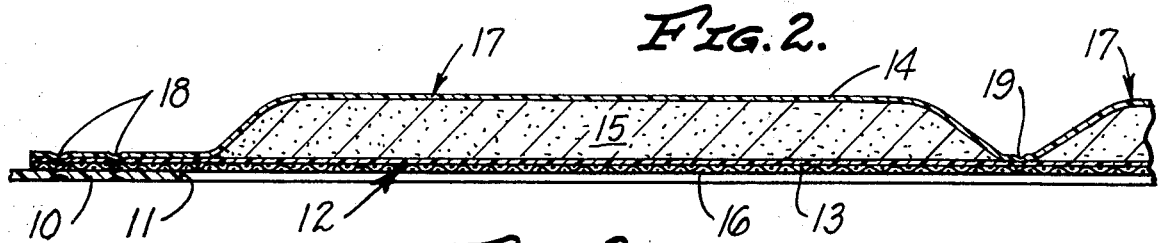
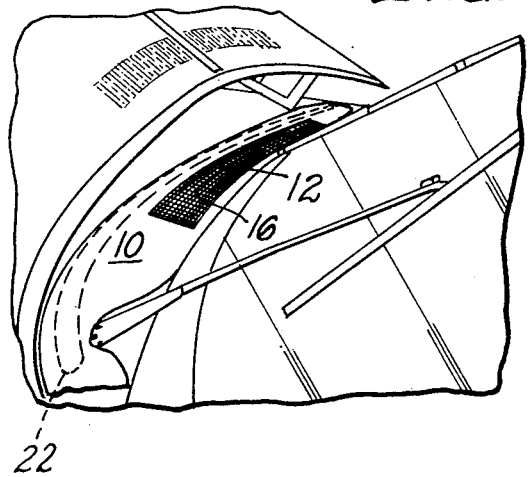
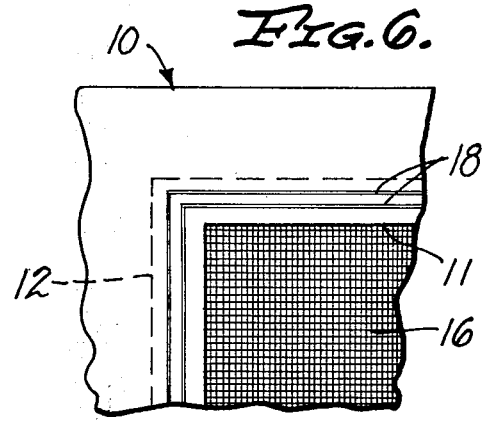
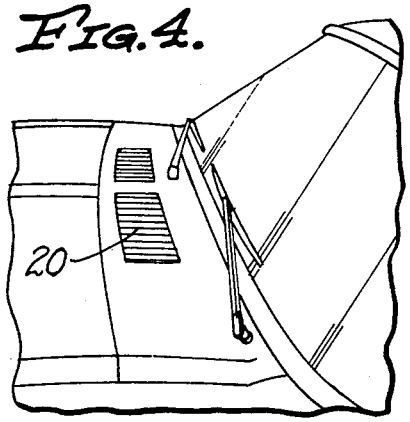
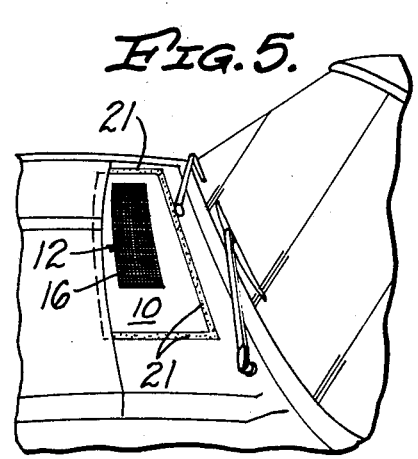

FILTER ATTACHMENT FOR AUTOMOBILE PASSENGER COMPARTMENT AIR INTAKE

BACKGROUND OF THE INVENTION

1. Field of the Invention

The invention relates to an attachment for filtering air entering the passenger compartment intake of an automobile.

2. Description of the Prior Art

At the present time, no effort is made to filter the air entering into the passenger compartment of an automobile. Since most automobiles are now air conditioned, the windows are kept closed. There is a single air intake located directly in front of the windshield beneath the hood in later models and between the hood and windshield in earlier models.

The automobile air conditioning unit customarily takes in 60 percent outside air and recirculates 40 percent inside air. If the automobile happens to be stopped directly behind a bus or truck or an automobile with a faulty exhaust system, substantial amounts of diesel or gasoline fumes will enter the passenger compartment through the air intake to be breathed by the occupants of the automobile. The contaminated air will also continue to be recirculated by the air conditioning system.

Other contaminants or pollutants which may be drawn into the passenger compartment of an automobile include road dust and dirt, pollen, smoke, smog, lint, rubber tire dust, and various other impurities carried by or in the air.

SUMMARY OF THE INVENTION

The primary object of the present invention is to provide an attachment which is adapted to be mounted in overlying relationship to the air intake of an automobile and which provides means for filtering exhaust fumes and other impurities and pollutants from the air before it enters the passenger compartment.

Another object of the invention is to provide such a device which is simple and economical to manufacture and install, so that it is capable of being sold at a relatively low price for widespread use.

A further object of the invention is to provide such a device which is universal in the sense that it can easily be installed on or adapted to substantially any make or model of automobile now in use.

It is another object of the invention to provide such an attachment which incorporates means for closing off all portions of the air intake which are not filtered, so that only filtered air enters the passenger compartment.

Still another object of the invention is to provide such a device which in most instances forms a cooperative relationship with the structure of the automobile to hold the attachment in place over the air intake.

The invention also comprises such other objects, advantages, and capabilities as will later more fully appear and which are inherently possessed by the invention.

While there is shown in the accompanying drawings a preferred embodiment of the invention, it should be understood that the same is susceptible of modification and change without departing from the spirit of the invention.

DESCRIPTION OF THE DRAWINGS

FIG. 1 is a bottom plan view of the complete filter attachment;

FIG. 2 is a partial sectional view of the same taken on line 2—2 of FIG. 1;

FIG. 3 is a perspective view showing the attachment installed beneath the open hood of an automobile;

FIG. 4 is a perspective view of another model of automobile having an outside air intake;

FIG. 5 is a perspective view showing the filter attachment in use on an automobile of the type shown in FIG. 4.

FIG. 6 is a fragmentary top plan view of a portion of the filter attachment.

DESCRIPTION OF THE PREFERRED EMBODIMENT

A preferred embodiment which has been selected to illustrate the invention comprises a large rectangular sheet 10 which is preferably formed of a thin laminate which includes foil, vinyl and paper. The preferred material is a laminate described as vinyl foil paper foil vinyl. The length of the sheet 10 is preferably somewhat less than the width of the hood of a conventional automobile and the width is preferably somewhat greater than the distance between the windshield and the adjacent edge of the hood.

A rectangular opening 11 is cut in the center of the sheet 10 and is completely covered by a filter unit 12, which is complementary to and somewhat greater in size than the opening 11. The filter unit 12 comprises two layers 13 and 14 of non-woven paper comprising or containing vinyl. The layers 13 and 14 are preferably heat sealed to each other around their outer edges and along a plurality of spaced transverse lines 19 to form a plurality of separate rectangular pockets 17, each of which is filled with pieces of activated charcoal 15.

A fine mesh screen 16 which is preferably formed of or which contains vinyl is mounted in overlying relationship to one side of the filter unit 12. The screen 16 is preferably complementary to and slightly greater in size than the filter unit 12.

The entire peripheral edges of the filter unit 12 and screen 16 are secured to the sheet 10 around the edges of the opening 11 by electrical inductive type heat sealing. This is possible because all of the structural elements either comprise or contain thermoplastic material. This sealing is accomplished along a pair of parallel lines 18 which extend around the periphery of the opening 11.

Referring to FIGS. 3–5 of the drawings, the air filter attachment of the present invention can be mounted on most late model automobiles in a very quick and simple manner. Such automobiles customarily have their air intakes located beneath the hood, as shown in FIG. 3. All that is necessary is to raise the hood of the automobile and lay the filter attachment so that it extends transversely across the automobile with the filter unit 12 disposed directly over the center of the air intake opening of the automobile. The long edge of the sheet 10 which is remote from the windshield should be folded over the gasket 22 which the hood rests upon. Some automobiles of this type have vents in the hood above the air intake, as indicated by phantom lines in FIG. 3. In other models, such vents are omitted.

FIG. 4 shows another type of automobile in which the air intake 20 is located between the hood and the windshield. On such automobiles, the filter attachment is installed in the manner shown in FIG. 5 of the drawings. The attachment is first trimmed to fit the automobile. Strips of masking tape 21 are then applied around all three of the exposed edges of the attachment to prevent it from being displaced by wind, rain, car washing, etc. The fourth forward edge of the attachment is allowed to hang over into the engine compartment of the automobile, so that the hood gasket holds it in place when the hood is down.

We claim:

1. The combination of a filter attachment and an automobile, said automobile having a passenger compartment, a hood and an air intake for said passenger compartment, said air intake being disposed beneath or adjacent to said hood, said attachment being positioned in overlying relationship to said air intake, said attachment having a filter unit, said filter unit comprising two layers of porous flexible non-woven paper, each layer containing thermoplastic material, said layers being heat sealed together to form a plurality of adjacent pockets extending continuously across the major portion of said air intake, each of said pockets containing a plurality of small pieces of activated charcoal, said attachment having a sheet surrounding said filter unit, said sheet closing off all of the portions of said air intake except those beneath said filter unit, whereby all air passing into said passenger compartment through said air intake passes through and is filtered by said filter unit.

2. The structure described in claim 1, said sheet containing thermoplastic material, said filter unit being heat sealed around its periphery to said sheet.

3. The structure described in claim 2, and a fine mesh screen disposed in overlying relationship to said filter unit, said screen containing thermoplastic material, said screen being heat sealed around its periphery to said sheet and filter unit.

4. The structure described in claim 3, said filter unit comprising a plurality of adjacent rectanglar pockets extending across the entire area of said filter unit.

5. The structure described in claim 4, said automobile having a windshield disposed adjacent to one edge of said hood and a hood gasket disposed beneath the edge of said hood adjacent to said windshield, said sheet having one edge thereof disposed between said hood gasket and the edge of said hood adjacent to said windshield.

6. The structure described in claim 5, the other three edges of said sheet being secured on top of said hood by strips of adhesive carrying tape.

* * * * *